United States Patent

Caron

[15] 3,648,043

[45] Mar. 7, 1972

[54] LOGARITHMIC FUNCTION GENERATOR UTILIZING AN EXPONENTIALLY VARYING SIGNAL IN AN INVERSE MANNER

[72] Inventor: Paul R. Caron, Norwood, Mass.

[73] Assignee: The United States of America as represented by the Administrator of the National Aeronautics and Space Administration

[22] Filed: May 28, 1970

[21] Appl. No.: 41,348

[52] U.S. Cl. ............ 235/197, 307/229, 328/145
[51] Int. Cl. ............ G06g 7/26, G06g 7/24
[58] Field of Search ............ 235/197, 194, 193; 328/145, 328/142; 307/229

[56] References Cited

UNITED STATES PATENTS 2,313,666 3/1943 Peterson ............ 328/145 X
2,600,423 6/1952 Nolle ............ 328/145 X
3,396,330 8/1968 Lee ............ 328/145 X

FOREIGN PATENTS OR APPLICATIONS 901,467 7/1962 Great Britain ............ 328/145

*Primary Examiner*—Joseph F. Ruggiero
*Attorney*—John R. Manning, Monte F. Mott, Wilfred Grifka and Paul F. McCaul

[57] ABSTRACT

A technique which utilizes an exponentially varying electrical signal in an inverse manner to derive the logarithm of an input signal is disclosed. In a preferred embodiment of apparatus utilizing the technique, a voltage commensurate with an input signal is compared with an exponentially decaying voltage to provide an output proportional to the time required for the exponential voltage to fall from a preset reference level to the level of the voltage commensurate with the input. This output is employed to control a pulse generator and the output of the pulse generator is averaged to provide a DC voltage which is the logarithm of the input signal.

11 Claims, 5 Drawing Figures

INVENTOR
PAUL R. CARON
BY Herbert E. Farmer
ATTORNEY

LOGARITHMIC FUNCTION GENERATOR UTILIZING AN EXPONENTIALLY VARYING SIGNAL IN AN INVERSE MANNER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates to electrical function generators. More particularly, the present invention is directed to a technique which utilizes an exponentially varying electrical signal in an inverse manner to derive the logarithm of an input signal. Accordingly, the general objects of the present invention are to provide novel and improved methods and apparatus of such character.

2. Description of the Prior Art

Logarithmic converters or function generators are, of course, well known in the art. The two preferred prior art methods for generating output signals proportional to the logarithm of an input signal may be generally categorized as electromechanical and electronic schemes. The electromechanical methods have typically utilized a precision logarithmic potentiometer and associated servomechanism. The purely electrical or electronic methods have typically employed diodes and other circuit components interconnected to approximate a logarithmic response. In the electronic methods, the diodes and other circuit components have on occasion been connected in the feedback circuit for an operational amplifier. In methods of the latter type, inaccurate variable or compression amplification with its inherent change in accuracy with dynamic range expansion has resulted.

The disadvantages of the electromechanical function generators are well known and will be obvious to those skilled in the art. These disadvantages include large physical size, relatively high power consumption and poor frequency response. The principal disadvantage of prior art electronic methods for generating logarithmic output signals has been poor accuracy. This lack of accuracy is a direct result of the fact that previous electronic approaches have, as noted above, typically, employed nonlinear circuit components to approximate logarithmic response and/or have attempted to vary amplifier gain.

SUMMARY OF THE INVENTION

The present invention overcomes the above briefly discussed and other disadvantages of the prior art and, in so doing, provides a new and improved logarithmic conversion technique and circuit. The circuitry of the present invention is based upon a technique which utilizes an exponentially varying electrical signal in an inverse manner to derive the logarithm of an input signal. Thus, in accordance with the present invention, an input signal is compared with an exponentially decaying voltage in order to provide an output proportional to the time required for the exponential voltage to fall from a preset reference level to the level of the input signal. Through observation of this time period, the logarithm of an input signal may be calculated.

In a preferred embodiment of the invention, the exponentially decaying voltage is generated by applying the output of an astable multivibrator circuit to an RC circuit. The voltage developed across the RC circuit and the input signal are applied to a voltage comparator; which may comprise a differential amplifier, a voltage limiter and a differentiating circuit; whereby the comparator will provide output pulses of opposite polarity commensurate with the exponential voltage crossing the level of the input signal. These voltage pulses are employed to control a multivibrator and the multivibrator output pulses are averaged to provide a DC output voltage commensurate with the logarithm of the input signal. In a second embodiment of the invention, a parallel arrangement of the above-described circuits is employed to extend the dynamic range of the present logarithmic conversion circuitry without loss of accuracy.

BRIEF DESCRIPTION OF THE DRAWING

The present invention may be better understood and its numerous objects and advantages will become apparent to those skilled in the art by reference to the accompanying drawing wherein like reference numerals refer to like elements in the various figures and in which:

FIG. 4 including

DESCRIPTION OF THE PREFERRED EMBODIMENTS

Figure 1:
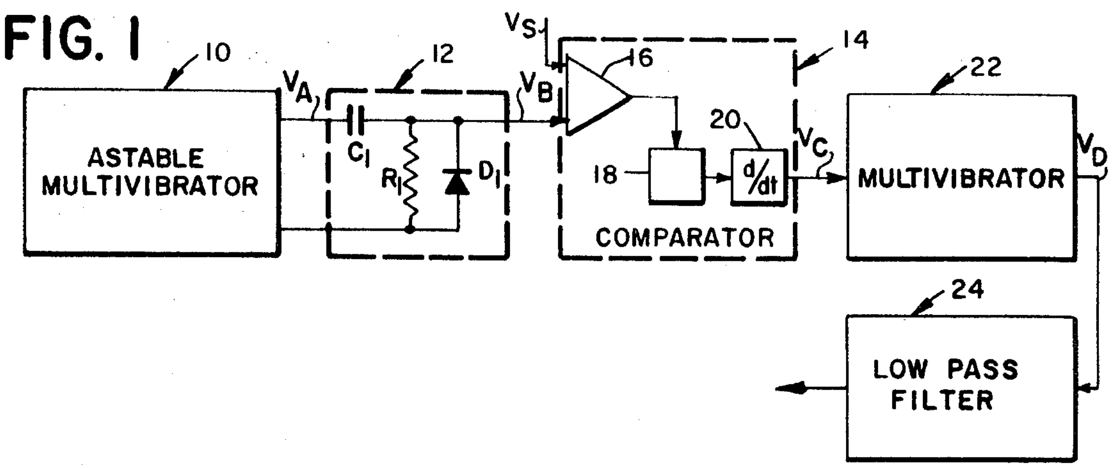
FIG. 1 is a block diagram of a first embodiment of the present invention.
Figure 2:
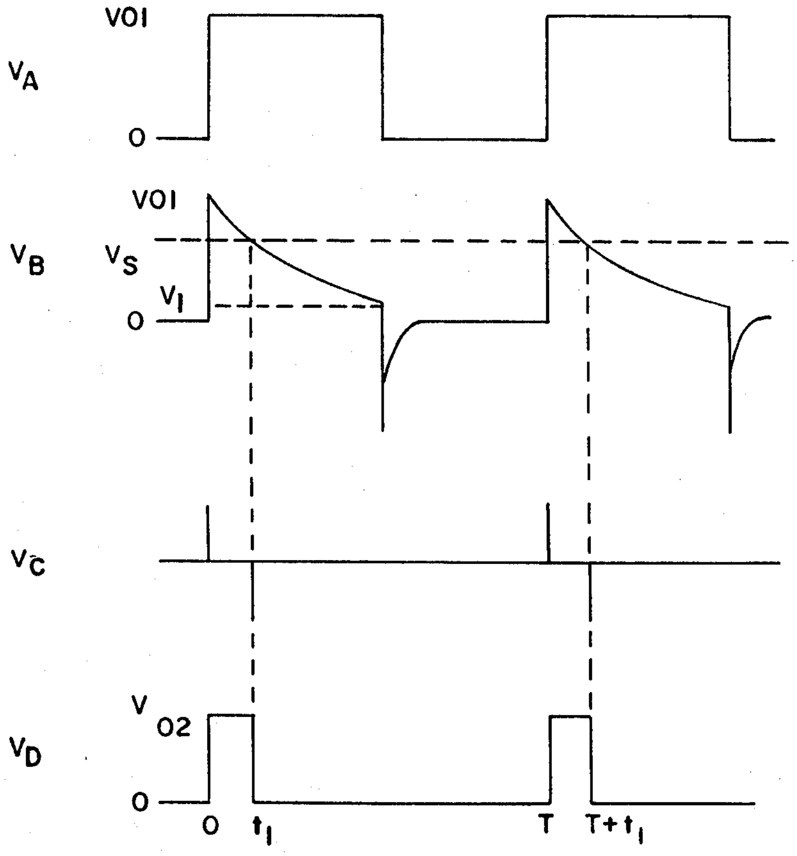
FIG. 2 is a waveform diagram depicting voltages which appear at various points in the circuit comprising the embodiment of FIG. 1.

With reference now simultaneously to FIGS. 1 and 2, a square wave signal $V_A$ from a free-running multivibrator 10 is applied to an exponential voltage generator indicated generally at 12. Circuit 12 comprises capacitor $C_1$ resistor $R_1$ and diode $D_1$. The RC circuit comprising resistor $R_1$ and capacitor $C_1$ forms a differentiator circuit; the time constant of the circuit being chosen in accordance with the desired dynamic range of the converter. Diode $D_1$ is connected in parallel with the differentiator comprising $C_1$ and $R_1$ in order to insure a zero voltage across the differentiator at the beginning of each cycle by rapidly discharging negative charges built up on $C_1$.

The output of circuit 12 is a voltage which decays exponentially with time, from a level established by the output of multivibrator 10, during the period of the multivibrator output pulses. Accordingly, the output of circuit 12 will be as shown by wave form $V_B$ in FIG. 2.

The exponentially decaying voltage $V_B$ from RC circuit 12 is applied as a first input to a voltage comparator 14. A DC voltage $V_S$ commensurate with the input signal to the circuit is applied as the second input to comparator 14. The output of voltage comparator 14 is depicted by waveform $V_C$ in FIG. 2. Wave form $V_C$ comprises alternate positive and negative going voltage spikes with the period between a positive pulse and the next succeeding negative pulse being equal to the time required for the exponentially varying voltage $V_D$ to fall from its maximum or preset reference level to the level of voltage $V_S$.

In order to generate voltage $V_C$ from the applied inputs, voltage comparator 14 may comprise the combination of a differential amplifier 16, a voltage limiter 18 and differentiating circuit 20. It is, however, to be recognized that there are other circuits available which will perform the voltage comparison function as described above.

The alternate polarity voltage spikes comprising waveform $V_C$, as provided at the output of comparator 14, are applied as the control input to a bistable multivibrator circuit 22 such that the positive pulses at $T=O$, $T$, etc., are used to induce a transition in the multivibrator such that the output voltage changes from zero to a fixed voltage $V_{02}$. The negative pulses in wave form $V_C$ occurring at $t=t_1$, $T+t_1$, etc., are used to induce the reverse transition.

The voltage $V_D$ provided at the output of multivibrator 22 is supplied to a low-pass filter 24; the output of filter 24 being a DC voltage level commensurate with the average of the multivibrator output pulse chain. This average is proportional to $t_1$ for the fixed value of $V_{02}$ and $T$. Since the exponentially decaying voltage $V_B$ may be expressed as follows:

$$V_B=V_{01} \exp. (-t)/RC \quad (1)$$

Where:

$O \leq t \geq T/2$ $$t_1=RC\, 1\, (V_{01})/V_S \quad (2)$$

Where:

$V_1 \leq V_S \leq V_{01}$

Accordingly, it may be seen that the average of $V_D$, which is proportional to $t_1$, is a measure of log ($V_{01}/V_S$). The dynamic range of of the system is:

$$V_1 \leq V_S \leq V_{01} \quad (3)$$

and can be increased by increasing $V_{01}$, decreasing $RC$ or increasing T.

Figure 3:
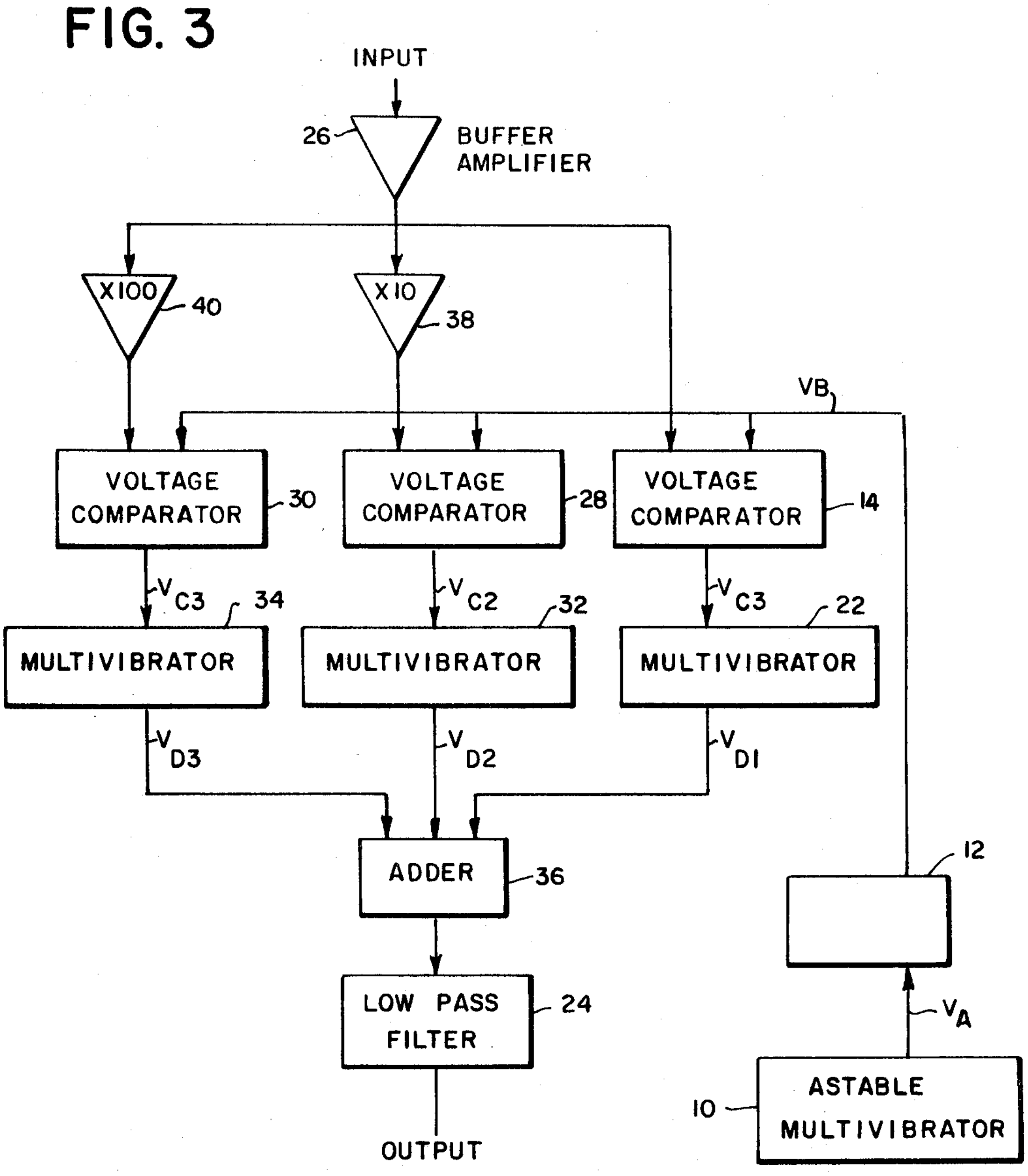
FIG. 3 is a block diagram of a second embodiment of the present invention.
Figures 4A, 4B:
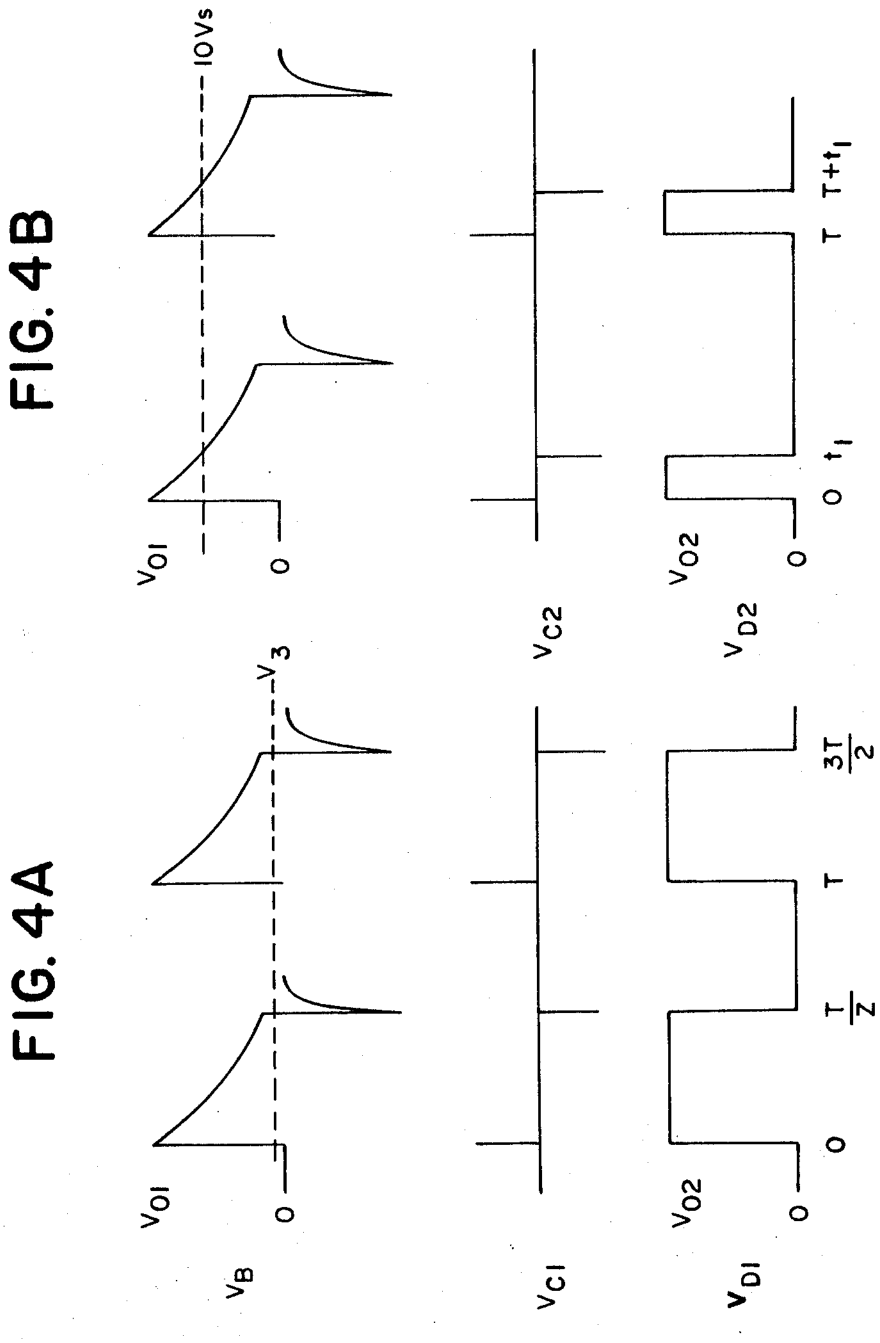
FIGS. 4A and 4B, is a wave form diagram depicting voltages which appear at various points in the circuit comprising the embodiment of FIG. 3.

With reference now to FIGS. 3 and 4, a second embodiment of the present invention is depicted. While employing the same principals as the embodiment of FIG. 1, the FIG. 3 system provides an arbitrarily wide dynamic range by employing parallel branches; three branches being shown for purposes of illustration. In addition to the elements of the FIG. 1 embodiment, the system of FIG. 3 employs an input buffer amplifier 26, second and third voltage comparators 28 and 30, third and fourth pulse generators 32 and 34 and a pulse summation circuit or adder 36. The embodiment of FIG. 3 also employs amplifiers 38 and 40. Amplifiers 38 and 40 must be accurate and linear for output voltages up to $V_{01}$ but may be allowed to saturate beyond this point.

In operation, the branch with no amplification of the input signal $V_S$ operates as before to generate output pulse $V_{01}$. The signal $V_S$ in the other two branches is, in the example of FIG. 3, amplified by a factor of 10 in the channel including amplifier 38 and by a factor of 100 in amplifier 40. Considering the condition where the amplified input signal 10$v_S$ appearing at the output of amplifier 38 is never equal to the signal $V_B$ generated by the exponential function generator 12, the parallel branches including amplifiers 38 and 40 make no contribution to the system output voltage. Hence the output voltage is, as in the embodiment of FIG. 1, proportional to log ($V_{01}/V_S$). However, considering the following condition:

$$0.01\, V_{01} \leq V_S \leq 0.1 V_{01} \quad (4)$$

where $V_1=0.1\, V_{01}$ it may be seen from consideration of the voltage waveforms of FIGS. 4$a$ and 4$b$ that the output voltage will be obtained by adding and averaging the output signal $V_{D1}$ and $V_{D2}$ provided by the first two branches of the system. Since the output of the channel including amplifier 40 is greater than $V_{01}$, the output voltage $V_{D3}$ from this branch makes no contribution to the system output. Thus, considering the condition expressed at (4) above, the output of the system is proportional to:

$$\log 10 + \log V_{01}/10V_S = \log (V_{01}/V_S \quad (5)$$

It should be obvious to those skilled in the art that, in the following case:

$$0.001\, V_{01} \leq V_S \leq 0.01\, V_{01} \quad (6)$$

the output voltage will be proportional:

$$\log 10 + \log 10 + \log V_{01}/100V_S = \log (V_{01})/V_S \quad (7)$$

Thus, in all cases, the proper output voltage is obtained from the system.

It is to be observed that the components of the embodiment of FIG. 3 may be changed to suit any desired condition. For example, instead of amplifying the signal $V_S$ by 10 and 100, the signal $V_B$ may be divided by these factors before application to the voltage comparators. It is also to be noted that low-pass filters may be employed between the multivibrators 22, 32 and 34 and adder 36. While the use of these additional low-pass filters will increase the circuit complexity and impose the requirement of a DC adder, it will reduce the dynamic range requirements of the adder.

While preferred embodiments have been shown and described, above, various modifications and substitutions may be made thereto without departing from the spirit and scope of the present invention. For example, buffer amplifier 26 of the FIG. 3 embodiment may comprise a chopper, AC amplifier and detector-filter or, alternatively, the voltage comparators may be responsive to the signals provided by a chopper. Also, the logarithm of the peak or average value of an AC voltage may obviously be obtained through the use of standard AC to DC converters. Accordingly, the present invention comprises a logarithmic function generator having increased range when compared to the prior art, such increased range being achieved without loss of accuracy and without the use of such nonlinear prior art components as compression amplifiers or circuit components which approximate a logarithmic response. Thus, it may be seen that the present invention has been described by way of illustration and not limitation.

What is claimed is:

1. An electrical function generator comprising: first pulse generator means; voltages
   - means connected to the output of said first pulse generator means and responsive to the pulses provided thereby for generating voltages which have the same period as said pulses, said generated voltage s varying exponentially with time;
   - first comparator means, said first comparator means having a pair of input terminals, a first of said comparator input terminals being connected to receive said exponentially varying voltages;
   - means for applying a signal commensurate with an input signal to said first comparator means second input terminal whereby said first comparator means will provide control signals indicative of equality between said exponentially varying voltages and said signal commensurate with the input signal;
   - means for amplifying said signal commensurate with the input signal;
   - second voltage comparator means, said second comparator means being connected to receive said exponentially varying voltages and the output of said amplifying means, said second comparator means providing control signals indicative of equality between said exponentially varying voltages and said amplified signal commensurate with the input signal; and
   - means responsive to the control signals from said first and second comparator means for generating a signal commensurate with the logarithm of the input signal.

2. The apparatus of claim 1 wherein said means for generating a signal commensurate with the logarithm of the input signal comprises:
   - second pulse generator means responsive to said equality signals provided by said first comparator means for generating pulses having a width commensurate with the period said exponentially varying signals exceed the magnitude of said signal commensurate with the input signal;
   - third pulse generator means responsive to said equality signals provided by said second comparator means for generating pulses having a width commensurate with the period said exponentially varying signals exceed the magnitude of said amplified signal;
   - summing means connected to receive and add the pulses generated by said second and third pulse generating means; and
   - means responsive to the summed pulses appearing at the output of said summing means for averaging said pulses.

3. The apparatus of claim 2 wherein said first pulse generator means comprises:
   - astable multivibrator means.

4. An electrical function generator comprising:

first pulse generator means;

means connected to the output of said first pulse generator means and responsive to the pulses provided thereby for generating voltages which have the same period as said pulses, said generated voltages varying exponentially with time;

first comparator means, said first comparator means having a pair of input terminals, a first of said comparator input terminals being connected to receive said exponentially varying voltages;

means for applying a signal commensurate with an input signal to said first comparator means second input terminal whereby said first comparator means will provide control signals indicative of equality between said exponentially varying voltages and said signal commensurate with the input signal, said first comparator means including differential amplifier means having said first pulse generator means output signals and said signal commensurate with the input signal applied as inputs thereto, and differentiator means connected to the output of said differential amplifier means and responsive to changes in polarity of said amplifier output signal for generating said control signals; and signal generating means responsive to said control signals indicative of equality for generating a signal commensurate with the logarithm of the input signal, said signal generating means comprising second pulse generator means responsive to said control signals indicative of equality for generating pulses having a width commensurate with the period said exponentially varying signals exceed the magnitude of said signal commensurate with the input signal, and means for averaging the pulses provided by said second pulse generator means.

5. The apparatus of claim 2 wherein said first comparator means comprises:

differential amplifier means having said first pulse generator means output signals and said signal commensurate with the input signal applied as inputs thereto; and differentiator means connected to the output of said differentiator amplifier means and responsive to changes in polarity of said amplifier output signal for generating said control signals.

6. The apparatus of claim 4 wherein said means for generating an exponentially varying voltage comprises:

differentiator means connected to receive said first pulse generator means output pulses.

7. The apparatus of claim 2 wherein said means for generating an exponentially varying voltage comprises:

differentiator means connected to receive said first pulse generator means output pulses.

8. The apparatus of claim 5 wherein said means for generating an exponentially varying voltage comprises:

differentiator means connected to receive said first pulse generator means output pulses.

9. An electrical function generator comprising:

first means for generating voltages whose amplitudes vary exponentially with time from preselected peak amplitudes;

first comparing means for comparing said exponentially varying voltages with an input voltage signal and for providing control signals indicative of equality between said exponentially varying voltages and said input voltage signal;

second comparing means for comparing exponentially varying voltages with peak amplitudes, which are at a predetermined relationship with respect to the peak amplitudes of the exponentially varying voltages compared in said first comparing means, with a voltage signal having an amplitude which is at a selectable relationship with respect to the input voltage signal, said second comparing means providing control signals indicative of equality between said exponentially varying voltages and the voltage signal compared therein; and output means responsive to the control signals from said first and second comparator means for generating a signal commensurate with the logarithm of said input voltage signal.

10. The apparatus as recited in claim 9 wherein the peak amplitudes of the exponentially varying voltages compared in said second comparing means and definable as $P_2$ means are less than the peak amplitudes of the exponentially varying voltages compared in said first comparing means, definable as $P_1$.

11. The apparatus as recited in claim 10 wherein $P_2/P_1=(1)/10$.

* * * * *